United States Patent [19]

Hasegawa et al.

[11] Patent Number: 5,595,515

[45] Date of Patent: Jan. 21, 1997

[54] OUTBOARD MOTOR EXHAUST SYSTEM

[75] Inventors: Junichi Hasegawa; Yoshibumi Iwata; Yukio Sumigawa, all of Hamamatsu, Japan

[73] Assignee: Sanshin Kogyo Kabushiki kaisha, Hamamatsu, Japan

[21] Appl. No.: 455,902

[22] Filed: May 31, 1995

[30] Foreign Application Priority Data

Jun. 3, 1994 [JP] Japan .................................... 6-145564

[51] Int. Cl.⁶ .............................................. B63H 20/24
[52] U.S. Cl. ............................................................ 440/89
[58] Field of Search .......................... 440/88, 89; 60/272, 60/312–314

[56] References Cited

U.S. PATENT DOCUMENTS

| 3,045,423 | 7/1962 | Hulsebus | 60/312 |
| 5,041,036 | 8/1991 | Clark et al. | 440/89 |
| 5,378,180 | 1/1995 | Nakayama et al. | 440/89 |

Primary Examiner—Sherman Basinger
Attorney, Agent, or Firm—Knobbe, Martens, Olson & Bear LLP

[57] ABSTRACT

An outboard motor exhaust system that includes a simplified above-the-water exhaust gas discharge which is formed by an inverted U-shape tube that is detachably connected into the outer casing of the driveshaft housing so that the outer casing need not be formed with special passages for providing for exhaust gas flow.

8 Claims, 5 Drawing Sheets 5,595,515

OUTBOARD MOTOR EXHAUST SYSTEM

BACKGROUND OF THE INVENTION

This invention relates to an outboard motor exhaust system and more particularly to an improved and simplified low-speed exhaust gas discharge for the outboard motor exhaust system.

As is well known, most outboard motors employ an exhaust system that has an underwater exhaust gas discharge through which the exhaust gases are discharged when operating at high speeds. Because of the compact nature of outboard motors, it is difficult to obtain the desired amount of exhaust gas silencing within the body of the outboard motor itself. By discharging the exhaust gases through the underwater exhaust gas discharge, the body of water in which the watercraft operates may be utilized as a silencing device, thus improving the silencing without making the outboard motor larger or more complicated.

However, when the watercraft is operating at a low speed, the underwater high-speed exhaust gas discharge is rather deeply submerged. This coupled with the lower exhaust gas pressures at low engine speed makes it difficult, if not impossible, to effectively discharge the exhaust gases to the atmosphere.

Therefore, most outboard motors employ, in addition to the high-speed underwater exhaust gas discharge, a low-speed above-the-water exhaust gas discharge. These above-the-water exhaust gas discharges are disposed so that their outlet ends are above the water level even when the watercraft is stationary in the body of water. Thus, the exhaust gases can be discharged through this above-the-water discharge when the engine is operating and the watercraft is either stationary or traveling at a low speed.

However, because of the inherent inability of the exhaust system within the driveshaft housing to totally silence the exhaust noises, the above-the-water exhaust gas discharge may produce objectionable noises. For that reason, it is the normal practice to include a series of baffles, expansion chambers, or other silencing devices formed within either the driveshaft housing, the spacer plate, the tray of the protective cowling, or a combination of these locations so as to silence the above-the-water exhaust gas discharge. However, these silencing devices are somewhat complicated and add to the difficulty and cost of forming the parts in which they are formed.

It is, therefore, a principal object of this invention to provide an improved and simplified exhaust gas outlet for an outboard motor.

It is a further object of this invention to provide an improved and simplified above-the-water, low-speed exhaust gas discharge for an outboard motor.

It is a further object of this invention to provide a simplified, but highly effective above-the-water exhaust gas discharge for an outboard motor.

SUMMARY OF THE INVENTION

This invention is adapted to be embodied in an above-the-water exhaust discharge for an outboard motor. The outboard motor has a driveshaft housing with an outer casing forming at least one exhaust gas discharge opening therein at a position above the level of water in which the associated watercraft operates at least at low speeds. Means define a cavity in the outer casing that is contiguous to the exhaust gas discharge opening. An expansion chamber is formed in the driveshaft housing within the outer casing. An internal combustion engine is supported above the driveshaft housing and drives a propulsion device supported by the driveshaft housing. The engine has an exhaust system that delivers the exhaust gases from the engine to the expansion chamber. A tube is provided that has one end which communicates with the expansion chamber and another end that communicates with the exhaust gas discharge opening of the driveshaft housing outer casing. At least one end of the tube is detachably received in the cavity for holding the tube in position. The tube serves the function of delivering the exhaust gases from the expansion chamber to the atmosphere through the exhaust gas discharge opening of the outer casing.

DETAILED DESCRIPTION OF THE PREFERRED EMBODIMENTS OF THE INVENTION

Figure 1:
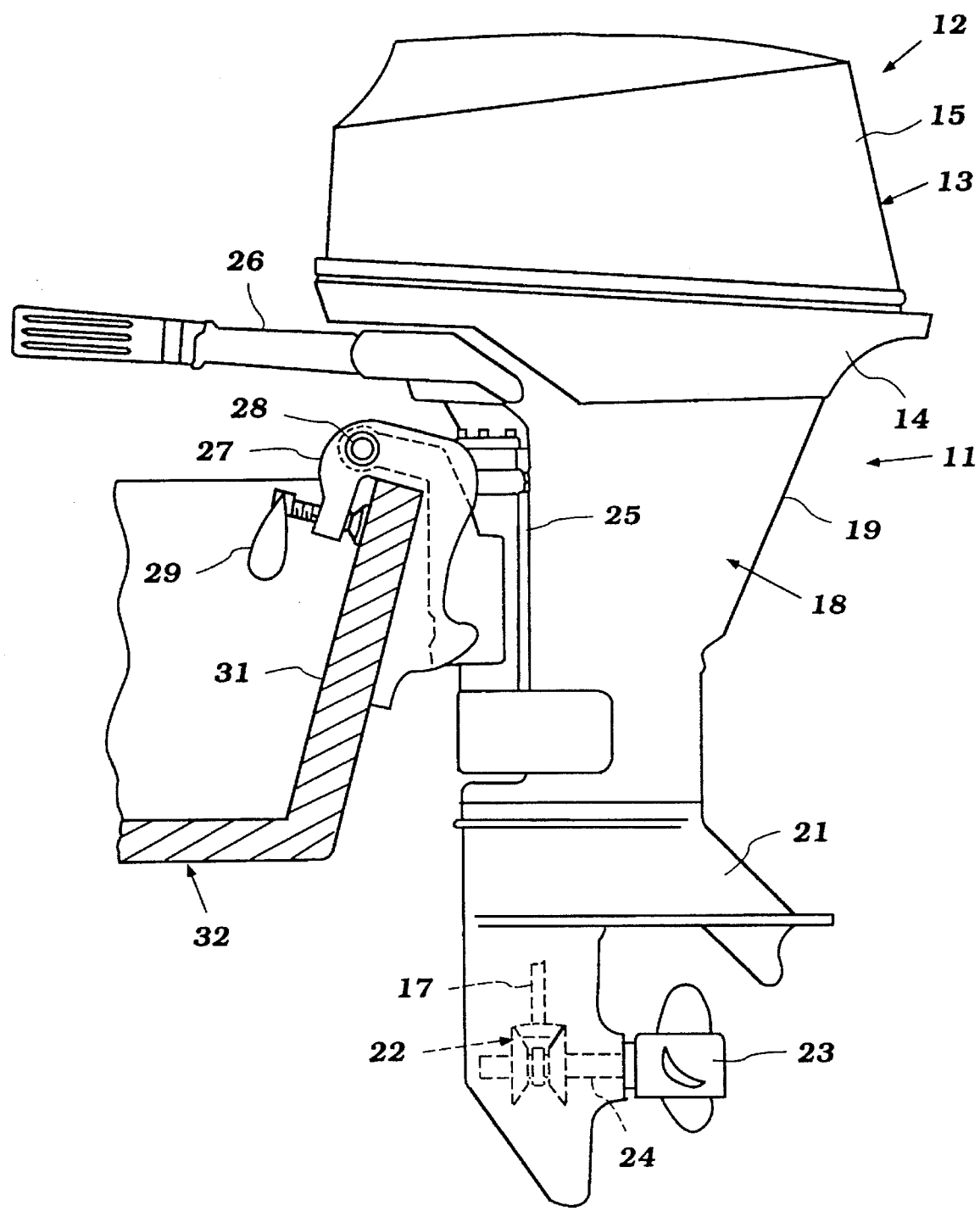
FIG. 1 is a side elevational view of an outboard motor constructed in accordance with an embodiment of the invention, as attached to the transom of an associated watercraft, shown partially and in phantom.

Referring now in detail to the drawings and initially primarily to FIG. 1, an outboard motor constructed in accordance with an embodiment of the invention is identified generally by the reference numeral 11. The outboard motor 11 is comprised of a power head, indicated generally by the reference numeral 12, and including a protective cowling, indicated generally by the reference numeral 13. The protective cowling 13 is comprised of a lower tray portion 14 which may be formed from a material such as aluminum and a main cowling portion 15 that is formed from a lighter weight material such as a molded fiberglass reinforced resin or the like. The main cowling portion 15 is detachably connected to the tray 14 in a known manner.

Figure 2:
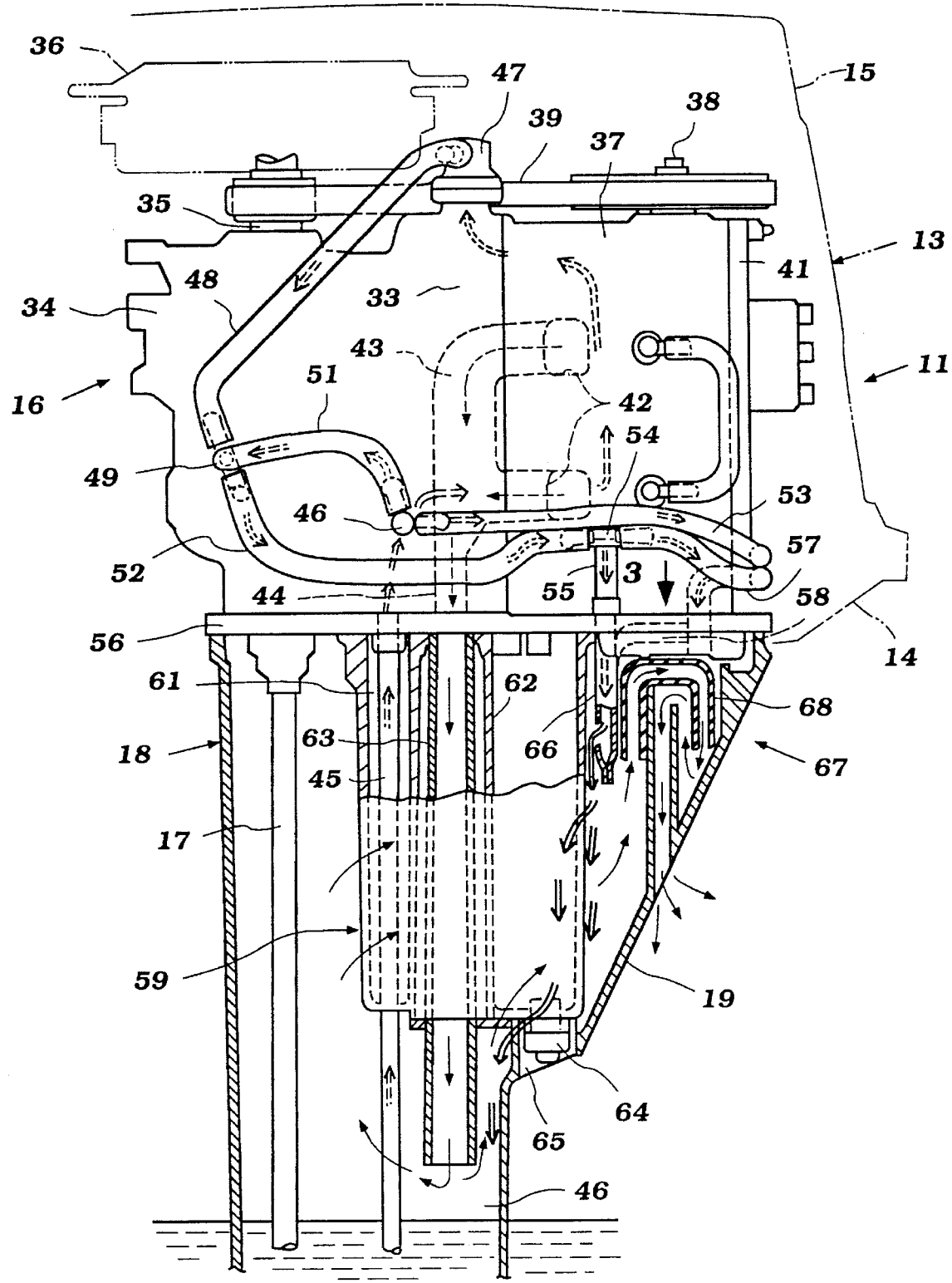
FIG. 2 is an enlarged view looking in the same direction as FIG. 1, with the protective cowling of the power head shown in phantom and with portions of the driveshaft housing broken away and shown in section.
Figure 3:
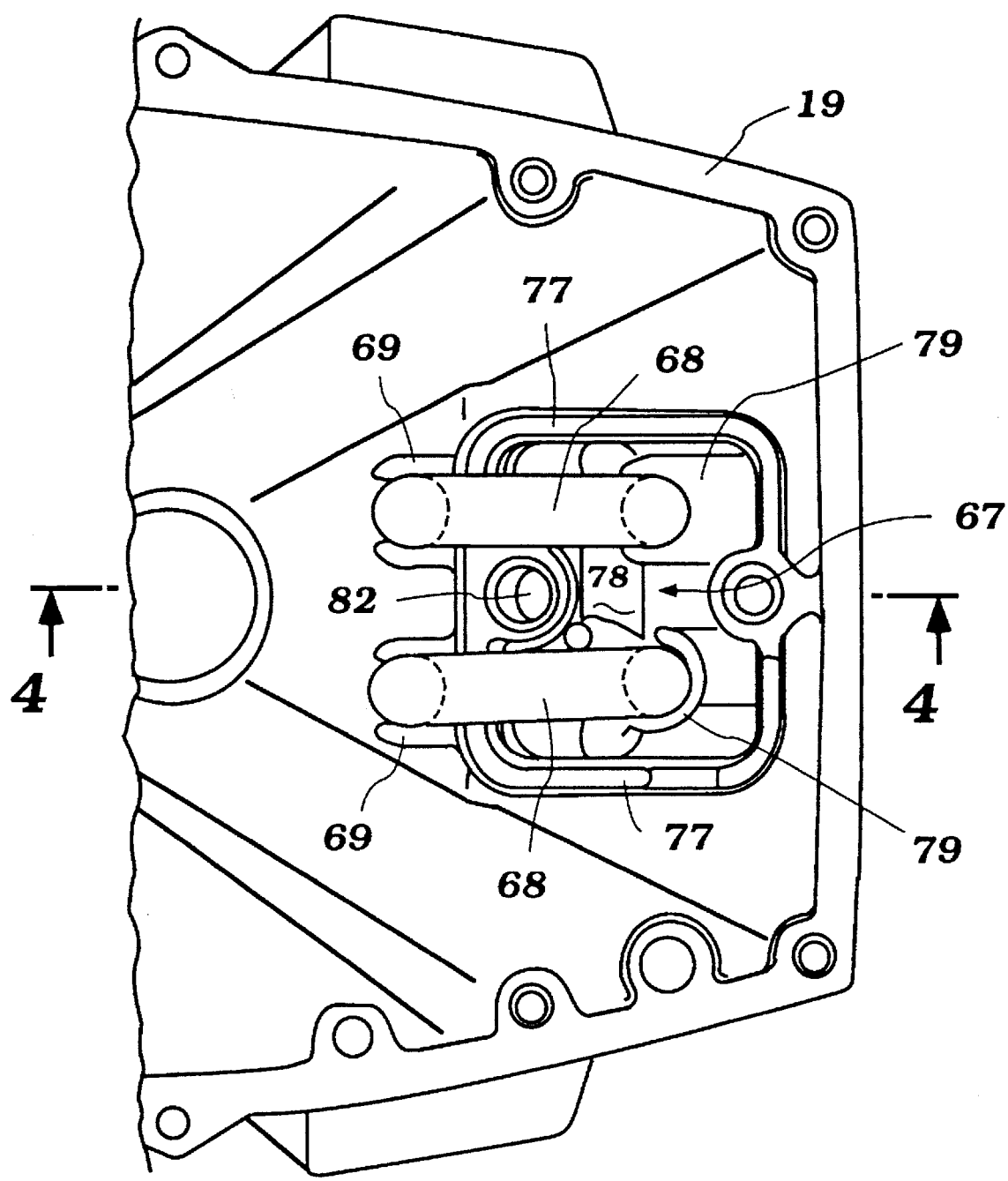
FIG. 3 is an enlarged top plan view looking generally in the direction of the arrow 3 in FIG. 2 and shows the upper rear portion of the driveshaft housing and components of the above-the-water low-speed exhaust gas discharge.

A powering internal combustion engine, indicated generally by the reference numeral 16 and not shown in FIG. 1 but which appears in FIG. 2, completes the power head 13. The engine 16 is disposed within the protective cowling 13 and will be described later by more reference to FIG. 2.

As is typical with outboard motor practice, the engine 16 is supported so that its output shaft rotates about a vertically extending axis. This output shaft, which will be described by reference to FIG. 2, is coupled to drive a driveshaft 17 which depends through and is journaled in a known manner in a driveshaft housing, indicated generally by the reference numeral 18. This driveshaft housing 18 includes an outer casing 19 which is formed from a lightweight material such as aluminum or aluminum alloy and is generally hollow, except as will be noted.

The driveshaft 17 continues on through the driveshaft housing 18 into a lower unit 21 wherein a forward neutral reverse transmission of a known type such as a bevel gear transmission, indicated generally by the reference numeral 22, is provided. This bevel gear transmission 22 selectively drives a propeller 23 in forward or reverse directions through a propeller shaft 24 in a manner which is also well known in this art.

A steering shaft (not shown) is affixed to the driveshaft housing 18 and is journaled within a swivel bracket 25. A tiller 2,6 is affixed to the upper end of this steering shaft for steering of the outboard motor 11 in a well known manner.

The swivel bracket 25 is, in turn, pivotally connected to a clamping bracket 27 by means of a pivot pin 28. This accommodates tilt and trim operation of the outboard motor 11 in a manner well known in this art. The clamping bracket 27 includes a clamping device 29 for detachably affixing the outboard motor 11 to a transom 31 of an associated watercraft, shown partially and in cross-section and identified generally by the reference numeral 32. The foregoing construction is generally conventional and, for that reason, further details of the conventional components of the system are not necessary to understand the construction and operation of the invention.

Referring now primarily to FIG. 2, it will be seen that the engine 16 is comprised of a cylinder block 33 having a crankcase 34 at its forward end in which the engine output shaft, a crankshaft 35, is rotatably journaled. As has been previously noted, the crankshaft 35 rotates about a generally vertically extending axis and has its lower end drivingly connected to the driveshaft 17. A magneto generator assembly, shown in phantom and identified by the reference numeral 35, is fixed to the upper end of the crankshaft 35 for supplying electrical power, particularly to the ignition system of the engine.

The cylinder block 33 forms one or more cylinder bores and in the illustrated embodiment is comprised of the two-cylinder in-line type. It will be readily apparent, however, to those skilled in the art how the invention may be employed with engines having other numbers of cylinders and other configurations.

A cylinder head 37 is affixed to the cylinder block 35 and contains the valve operating mechanism for operating the intake and exhaust valves mounted within the cylinder head 37. Since the invention deals primarily with the exhaust system for the engine, the intake and exhaust valves, the induction system and other details of the cylinder head assembly 37 are not illustrated. Those skilled in the art will readily understand how the invention may be practiced with any of the wide variety of types of engines. Also, although the invention is described in conjunction with a four cycle engine, it will be apparent to those skilled in the art how the invention may be employed with engines operating on other principles.

Contained within the cylinder head 37 and journaled in it in a known manner is a camshaft 38 which is driven from the crankshaft 35 at one-half crankshaft speed through a toothed belt 39. This camshaft and the valve mechanism actuated by it are accessible through removal of a cam cover 41 that is affixed to the cylinder head 37, also in a known manner.

As noted, the exhaust system of the engine 16 and the method of exhaust treatment is the area where the invention resides. Therefore, the exhaust ports of the engine 16 have been shown in broken lines in FIG. 2 and are identified by the reference numerals 42. These exhaust ports 42 communicate with a manifold collector assembly 43 formed in the cylinder block 33 and which has a downwardly directed discharge opening 44. This communicates with an exhaust system which will be described later and which is positioned in primary part within the driveshaft housing 18.

The engine 16 is water cooled and, as is typical with outboard motor practice, this cooling water is drawn from the body of water in which the outboard motor 11 and associated watercraft 32 are operating. This water is drawn through a water inlet opening formed in the lower unit 21 by a water pump that is positioned at the interface between the lower unit 21 and the driveshaft housing 18. This water pump is driven by the driveshaft 17 in a well known manner and delivers water through a water supply conduit 45 that extends upwardly through a hollow interior 46 formed in the driveshaft housing outer casing 19.

This water is then delivered to a distributor port 46 which directs the major portion of the cooling water to the cooling jackets formed in the cylinder block 34 and therethrough through cooling jackets formed in the cylinder head 37. The flow of cooling water is shown by the open arrows in FIG. 2. A thermostatic valve 47 is mounted in the upper end of the cylinder block 34 and delivers water that has circulated through the cooling jacket to a return conduit 48. The return conduit 48 communicates with a T fitting 49. Some water from the cooling pump supply conduit 45 is delivered by the distributor 46 to a bypass conduit 51 for mixing with the heated water returned by the thermostat 47 before its discharge to a further return conduit 52.

Finally, the distributor 46 delivers some of the fresh cooling water to a pilot hose 53 for cooling other portions of the engine 16.

The conduit 52 supplies the mixed water to a further T fitting 54, some of which is delivered directly by a conduit 55 to a guide plate 56 for cooling it. A further amount of the coolant from the T fitting 51 is delivered to a conduit 57 and from it also to the guide plate 56 through an internal conduit 58 formed therein.

The cooling water which has been circulated through the aforenoted path is employed for cooling the exhaust system, the oil tank for the engine and other components located within the driveshaft housing 18, which will now be described again primarily by reference to FIG. 2.

Since the engine 16 is of the four cycle type in the illustrated embodiment, it is provided with a lubricant storage tank, indicated generally by the reference numeral 59, and which depends from the guide plate 56 into the cavity 46 of the driveshaft housing outer casing 19. The water inlet tube 45 passes through a cavity 61 formed in the oil tank 59. In addition, the oil tank 59 is provided with an internal tube 62 that passes an exhaust pipe 63 that is affixed to the underside of the guide plate 56 and which receives exhaust gases through the guide plate 56 from the exhaust outlet 44 of the cylinder block exhaust manifold 43. These exhaust gases are then delivered downwardly, as shown in the solid arrows, to the expansion chamber formed by the cavity 46 within the outer casing 19 of the driveshaft housing 18. Under normal high-speed running conditions, these exhaust gases are discharged to the atmosphere through an underwater exhaust gas discharge of a known type.

Finally, the oil tank 59 is provided with a drain plug 64 that is accessible through an opening 65 formed in the outer casing 19 so that oil may be drained and filled when the outboard motor 11 is still attached to the transom of the watercraft 32.

The water which is returned from the engine cooling jacket and from the paths aforenoted, is discharged through a discharge spray tube 66 so that this water, shown again by the open arrows, will flow over the outer periphery of the oil tank 59 and cool it.

As has already been noted, the exhaust gases from the expansion chamber volume 46 normally exit the expansion chamber volume 46 through a through-the-hub underwater exhaust gas discharge or other form of conventional underwater exhaust gas discharge.

As has also been noted, when the watercraft 32 is traveling at a low speed, this below-the-water exhaust gas discharge will be very deeply submerged, and this deep submersion will create more back-pressure than the pressure of the exhaust gases can generate, particularly since the engine 16 will be operating at a relatively low speed. In accordance with the invention, there is provide an improved, simplified and easy to form above-the-water low-speed exhaust gas discharge, indicated generally by the reference numeral 67.

Figure 4:
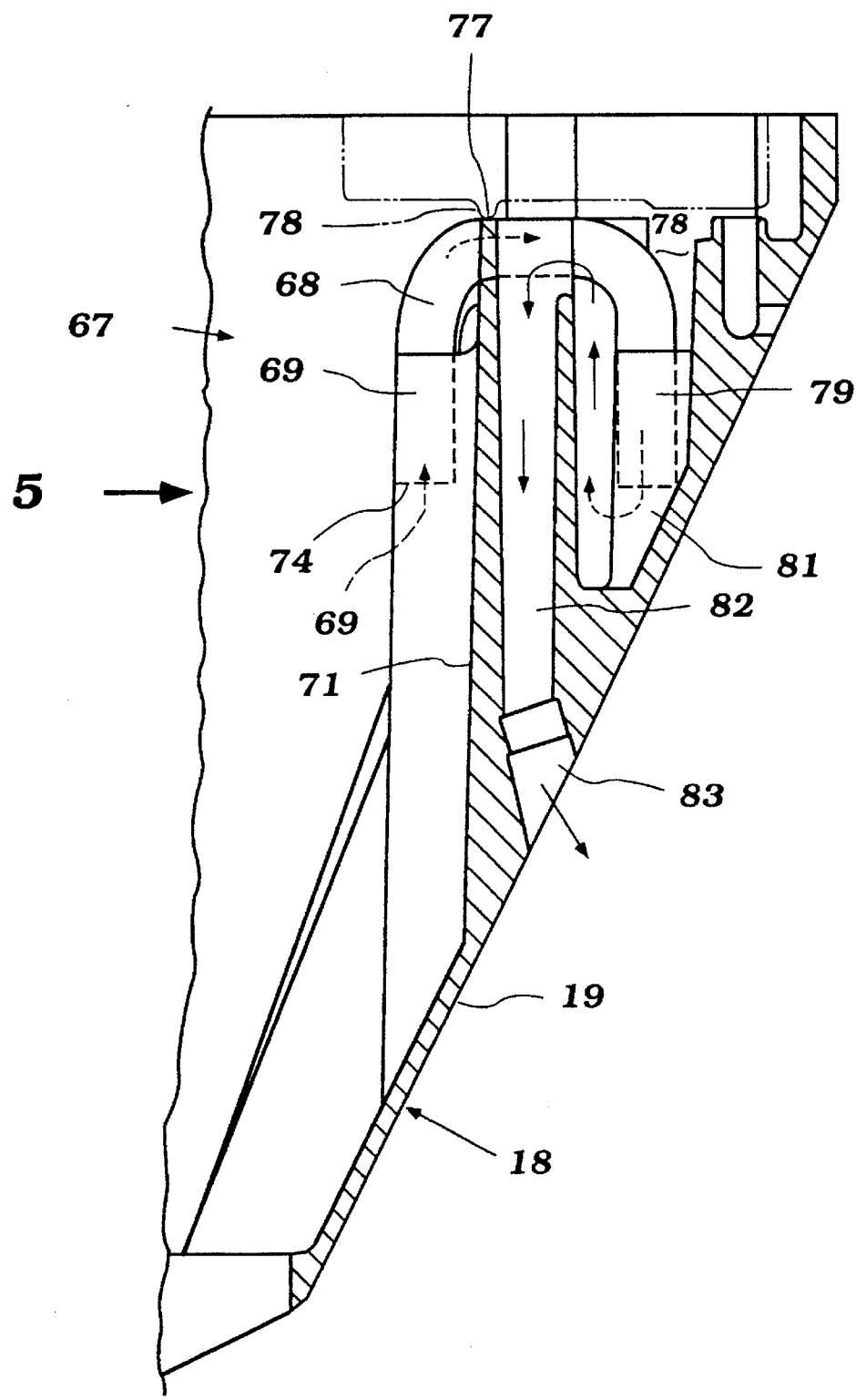
FIG. 4 is a cross-sectional view taken along the line 4—4 of FIG. 3.

This discharge is comprised of a pair of U-shaped tubes 68 which are disposed at the rear of the driveshaft housing in side-by-side fashion. These tubes have inlet ends which are disposed in registry with the expansion chamber 46 and which depend thereinto, as clearly shown in FIGS. 2 and 4. These inlet ends are detachably received in a pair of embossments 69 formed on an inner wall 71 of the driveshaft housing outer shell 19. These embossments 69 are formed with a cylindrical bore 72 at their upper ends and which terminates at a shoulder 73 against which a lower end 74 of the tube 68 extends. In addition to the cylindrical bore 72, each embossment 69 is formed with a slotted opening 75 which extends from its upper end to a point below the shoulder 73 so as to provide a restrictive exhaust inlet opening 76 through which the gases may flow into each of the tubes 68.

The tubes 68 extend over a shoulder 77 formed at the upper end of the wall 71 and are sealed by a peripheral rib 78 of the guide plate 56.

The rear side of the wall 71 defines a cavity 78 within which a further pair of embossments 79 are formed. Like the embossments 69, the embossments 79 are formed with a bored opening that receives the outlet end of the tube 68 and a slotted face that defines an opening 81 which permits the exhaust gases to enter the cavity 78, as shown by the flow arrows in FIGS. 2, 4 and 5.

A further opening 82 is formed in the driveshaft housing outer shell 19 and extends vertically downwardly so as to define a discharge port 83 through the driveshaft housing 18 through which the exhaust gases may exit, as shown by the arrows in the aforenoted figures.

Figure 5:
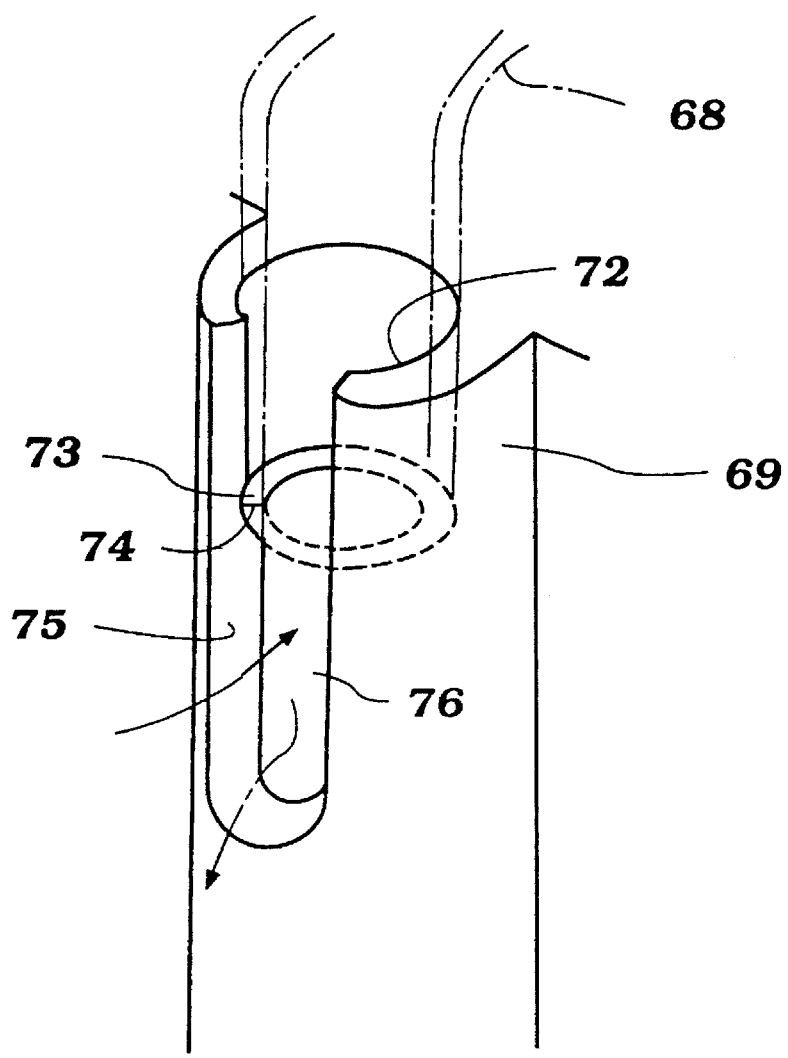
FIG. 5 is a perspective view looking generally in the direction of the arrow 5 in FIG. 4.

Should any water enter the low-speed exhaust gas discharge, this water can be drained out of the slotted opening 75 in the embossments 69, as shown by the phantom line arrow in FIG. 5. This water then will just mix with the remaining water and exhaust gases and be discharged through the underwater exhaust gas discharge.

It should be readily apparent from the foregoing description that this construction not only provides a very simple arrangement for forming the low-speed exhaust gas discharge, but also permits the passages to be formed in a somewhat intricate shape but without necessitating complex castings for the driveshaft housing.

Of course, the foregoing description is that of a preferred embodiment of the invention, and various changes and modifications may be made without departing from the spirit and scope of the invention, as defined by the appended claims.

We claim:

1. An above-the-water exhaust gas discharge for an outboard motor, said outboard motor having a drive shaft housing with an outer casing forming at least one exhaust gas discharge opening therethrough positioned above the level of water in which the associated watercraft is operating at low speeds, said outer casing forming an integral cavity contiguous to and communicating with said exhaust gas discharge opening, an expansion chamber formed in said drive shaft housing outer casing, an internal combustion engine positioned above said drive shaft housing and having an exhaust gas discharge, an exhaust pipe for delivering exhaust gases from said engine exhaust gas discharge into the interior of said outer casing of said drive shaft housing, and a generally U-shaped tube contained entirely within said drive shaft housing outer casing and having one end communicating with the interior of said drive shaft housing outer casing for receiving the exhaust gases therein and another end communicating with said exhaust gas discharge opening through said integral cavity, at least one end of said tube being detachably connected to said drive shaft housing outer casing.

2. The above-the-water exhaust gas discharge for an outboard motor of claim 1, wherein the tube has a restricted configuration for restricting the flow of exhaust gases therethrough.

3. The above-the-water exhaust gas discharge for an outboard motor of claim 2, wherein the detachable connection of the tube to the driveshaft housing is at one end of the tube and provides a restricted flow area.

4. The above-the-water exhaust gas discharge for an outboard motor of claim 3, wherein the one end comprises the inlet end.

5. The above-the-water exhaust gas discharge for an outboard motor of claim 4, wherein the one end comprises the outlet end.

6. The above-the-water exhaust gas discharge for an outboard motor of claim 3, wherein both ends of the tube are detachably received in the respective portions of the outer casing.

7. The above-the-water exhaust gas discharge for an outboard motor of claim 6, wherein the cooperation with each of the tube ends and the outer casing provide restrictions to the flow.

8. The above-the-water exhaust gas discharge for an outboard motor of claim 7, wherein there is further provided an underwater high-speed exhaust gas discharge communicating with the interior of the outer casing of the driveshaft housing.

* * * * *